United States Patent [19]

Hankes et al.

[11] 4,444,658
[45] Apr. 24, 1984

[54] ROTATING BIOLOGICAL CONTACTOR APPARATUS

[75] Inventors: Robert W. Hankes, Downington, Pa.; Lloyd H. Parker, Winona, Ohio

[73] Assignee: Crane Co., New York, N.Y. ; a part interest

[21] Appl. No.: 291,723

[22] Filed: Aug. 10, 1981

[51] Int. Cl.³ ............................................. C02F 3/08
[52] U.S. Cl. .................................. 210/150; 210/232; 210/619; 261/92
[58] Field of Search .............. 210/150, 151, 619, 331, 210/232; 261/92

[56] References Cited

U.S. PATENT DOCUMENTS

| 3,777,891 | 12/1973 | Stengelin | 210/150 |
| 3,904,525 | 9/1975 | Rosenberg | 210/150 |
| 4,149,972 | 4/1979 | Iwai et al. | 210/150 |
| 4,157,303 | 6/1979 | Yoshikawa et al. | 210/150 |
| 4,345,997 | 8/1982 | McConnell, Jr. et al. | 210/150 |

FOREIGN PATENT DOCUMENTS

53-82054 7/1978 Japan ................................ 210/619

Primary Examiner—Benoit Castel
Attorney, Agent, or Firm—Fitzpatrick, Cella, Harper & Scinto

[57] ABSTRACT

A water treatment apparatus comprising a tank, a shaft mounted for rotation in said tank, means for rotating said shaft and a plurality of frame assemblies. The shaft has a plurality of rows of bayonette lugs. Each frame assembly is adapted to be secured to a separate row of lugs, and is adapted to mount contactor media thereon. Means for securing each frame assembly to a separate row of lugs is provided.

8 Claims, 11 Drawing Figures

ROTATING BIOLOGICAL CONTACTOR APPARATUS

This invention relates to an apparatus for biological purification of water and, in particular, to an apparatus which provides for convenient replacement of its contactor media.

BACKGROUND OF THE INVENTION

Biological treatment of waste water involves the use of apparatus having rotating contactor media which provides surface area for the deposit of waste or biological slimes thereon. Due to prolonged use or damage from external forces, the contactor media, or portions thereof, may need to be replaced.

Heretofore, efficient and effective replacement of contactor media, especially only a portion thereof, has not been provided.

SUMMARY OF THE INVENTION

It is an object of this invention to provide an apparatus which permits replacement of its contactor media.

It is another object of this invention to provide an apparatus which permits replacement of only a portion of its contactor media.

It is still another object of this invention to provide an apparatus which permits efficient and relatively inexpensive replacement of all or a portion of its contactor media.

These and other objects of this invention are provided for by a water treatment apparatus comprising a treatment tank, a shaft mounted for rotation in said tank, means for rotating the shaft and a plurality of frame assemblies. The shaft has a plurality of rows of bayonette lugs. Each frame assembly is adapted to be secured to a separate row of bayonette lugs, and is adapted to mount contactor media thereon. Means for securing each frame assembly to a separate row of bayonette lugs is provided whereby rotation of said shaft results in rotation of the contactor media and the gradual deposit of slime on the media.

A DESCRIPTION OF THE PREFERRED EMBODIMENTS

Figure 1:
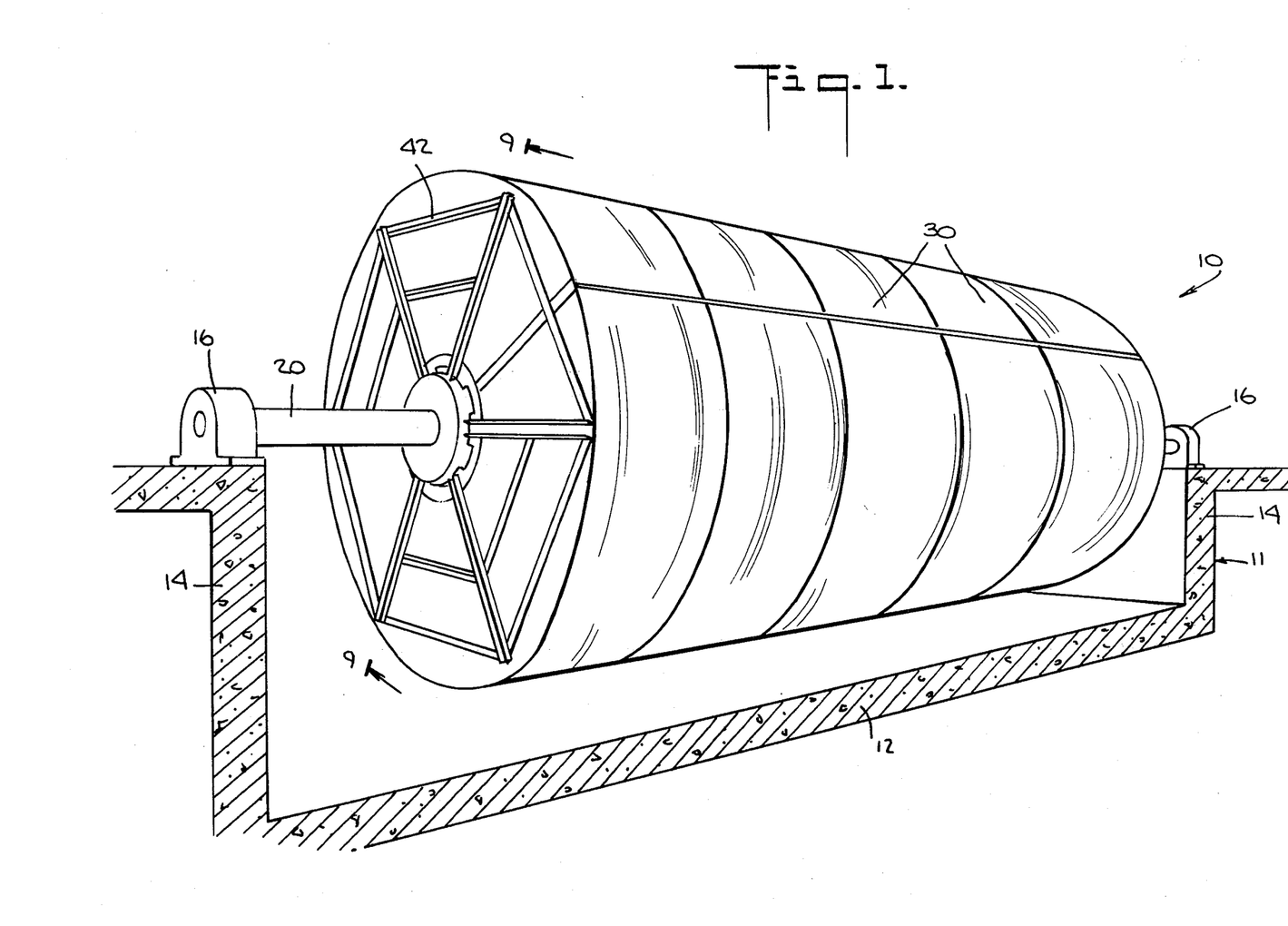
FIG. 1 is a perspective view of the apparatus.
Figure 2:
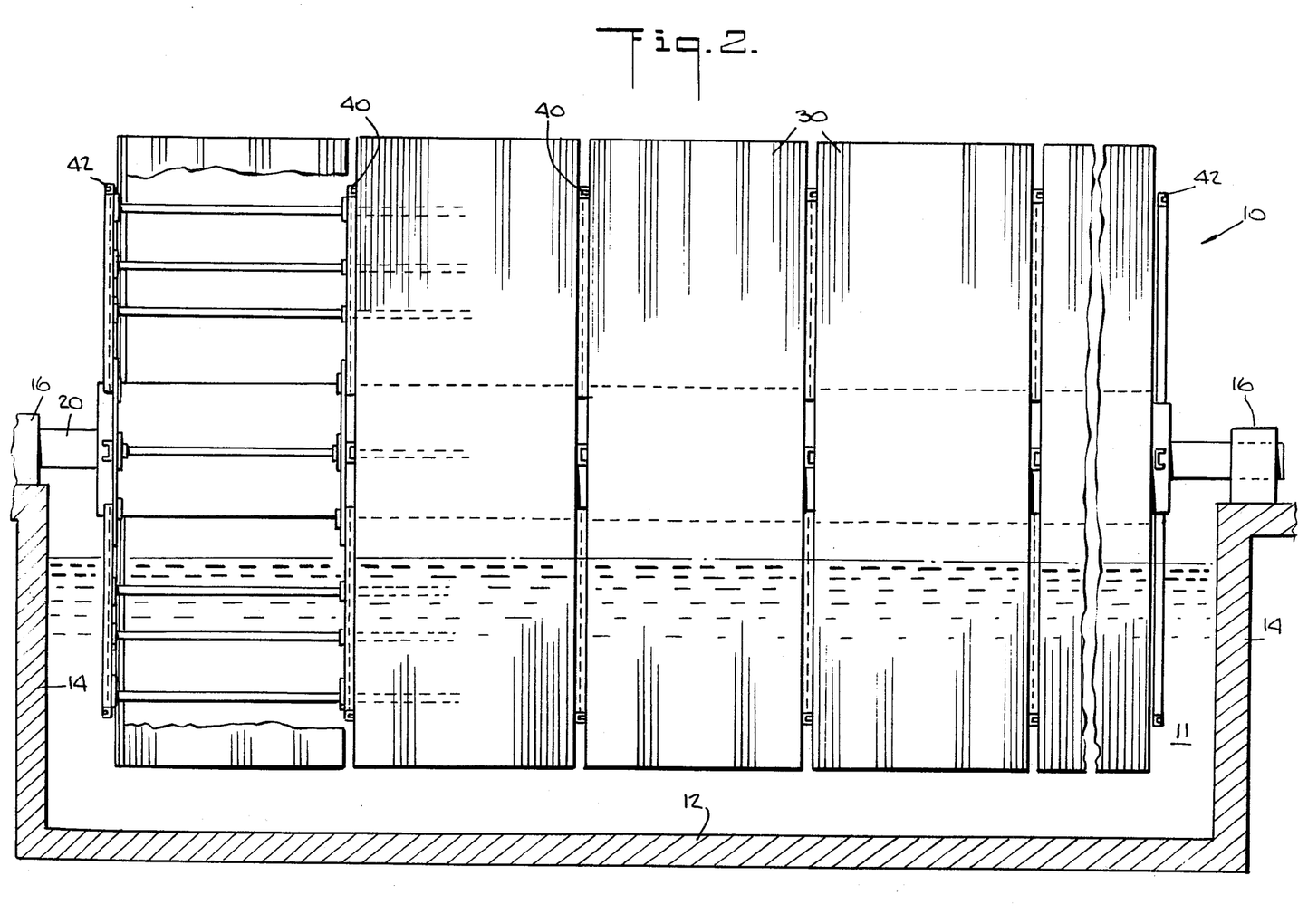
FIG. 2 is a plan view of the apparatus of FIG. 1 with a portion of the media removed.

Referring to the drawings and more particularly to FIGS. 1 and 2, a water treatment apparatus, generally represented by reference numeral 10, includes tank 11 having bottom 12 and walls 14 with bearings 16 secured thereto. Supported in bearings 16 and extending axially across tank 11 is shaft 20. Contactor media is positioned on shaft 20, is separated into discrete sections or media packs 30 via a number of removable spider-like inner frames 40, and is axially bounded by a pair of removable spider-like end frames 42. Waste water is introduced into, and treated water is withdrawn from, tank 11 via ports, not shown. Shaft 20 and associated media packs 30 are rotated via a motor, also not shown.

Figure 3:
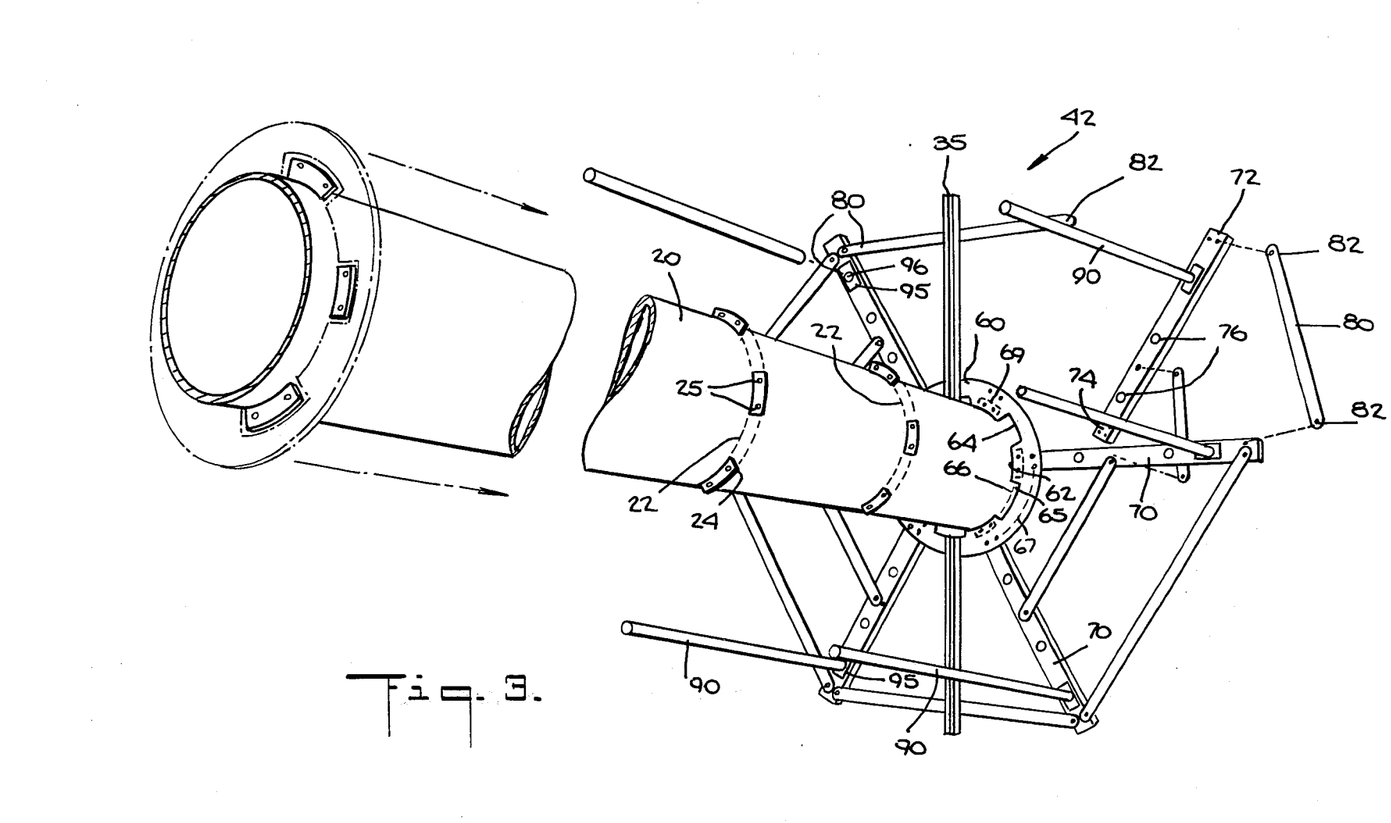
FIG. 3 is an exploded perspective view of the shaft with an end frame of the apparatus of FIG. 1.

Referring to FIG. 3, shaft 20 is a tubular metal shaft having a plurality of circumferential rows 22 of spaced apart radially projecting or bayonette lugs 24. Each lug 24 has, preferably, a pair of holes 25 axially therethrough.

Figure 4:
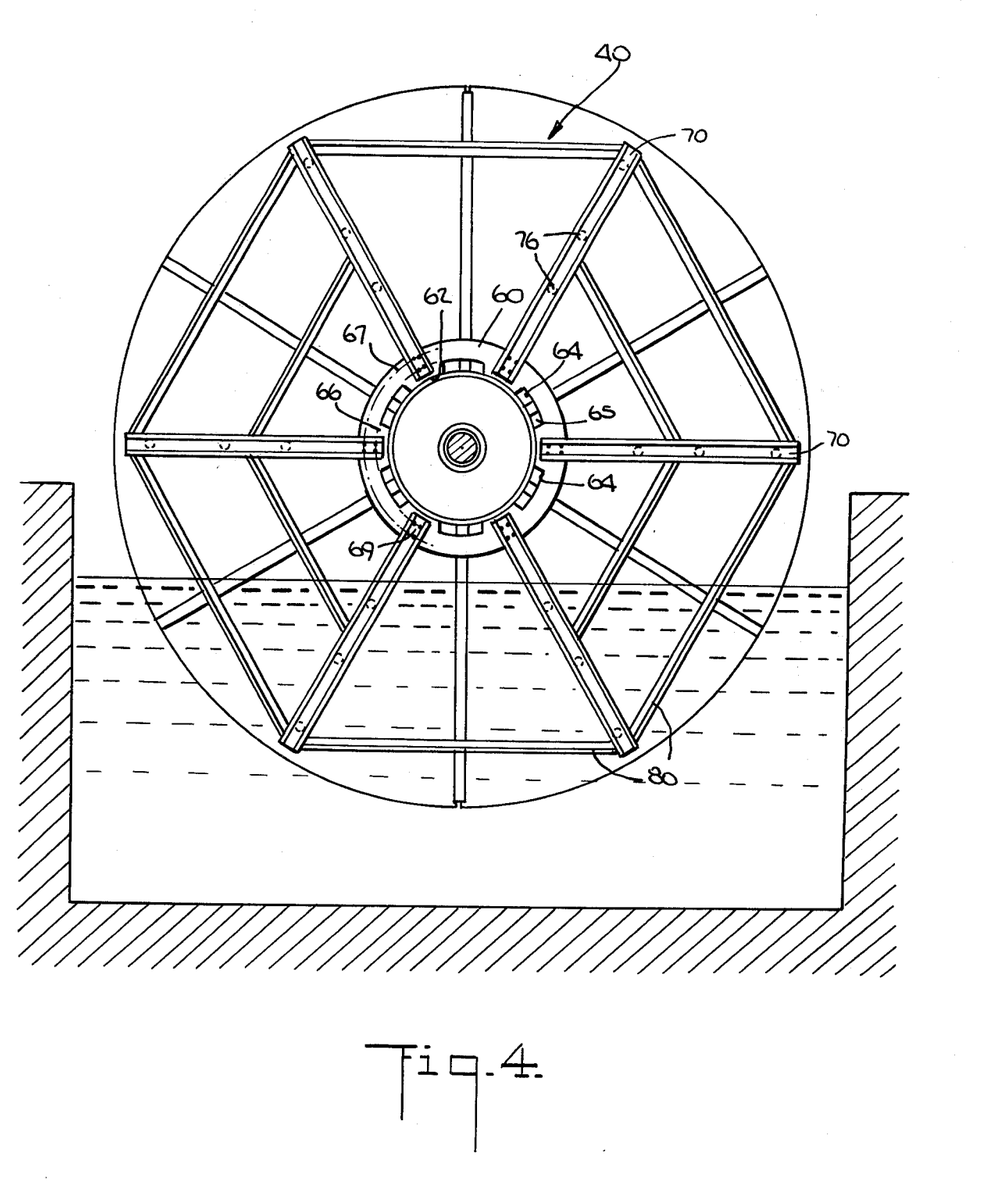
FIG. 4 is a plan view of an inner frame of the apparatus of FIG. 1.

Referring to FIGS. 3 and 4, each removable spider-like frame, whether it be an inner frame 40 or an end frame 42, is basically composed of collar 60, a plurality of spokes 70 connected to and radially disposed from the collar, a plurality of outer supports 80 with each support connecting a different pair of adjacent spokes, and a plurality of tubes 90 with each tube axially projecting from a different spoke.

Collar 60 is a hollow circular plate having circumferential inner surface 62, and having two circular rows 66, 67 of holes. Inner surface 62 is adapted to fit about shaft 20, and has a number of recesses 64 which, when collar 60 is positioned on the shaft, define with the shaft axial flow passages 65. Each of the rows 66, 67 consists of a plurality of spaced-apart pairs of holes, with a pair of one row radially aligned with a pair of the other row to form a set 69 of four holes. Each set 69 is disposed between different adjacent recesses 64 forming an alternating recess-set pattern.

Each spoke 70 is a relatively long, flat bar with two large diameter holes 76 therethrough and with a pair of holes 72 at one end and four holes in a set 74 at the other end. The holes of each set 74 are adapted to axially align with the holes of a separate set 69 of collar 60; furthermore, each pair of holes in row 66 of collar 60 is also adapted to axially align with a different pair of holes 25 in a circumferential row 22 of lugs 24. First means, such as a series of threadably engageable bolt and nut combinations, secures via connecting the axially aligned holes, each spoke 70 to collar 60 and the collar to the one circumferential row 22 of lugs 24.

Each outer support 80 is a relatively flat bar having a hole 82 therethrough at each end. Each outer support 80 is adapted to connect two adjacent spokes 70, via each hole 82 aligning with one of the pair of holes 72 of a different spoke 70. The outer support and spokes are secured together via second means, such as a series of threadably engageable bolt and nut combinations.

Figure 5:
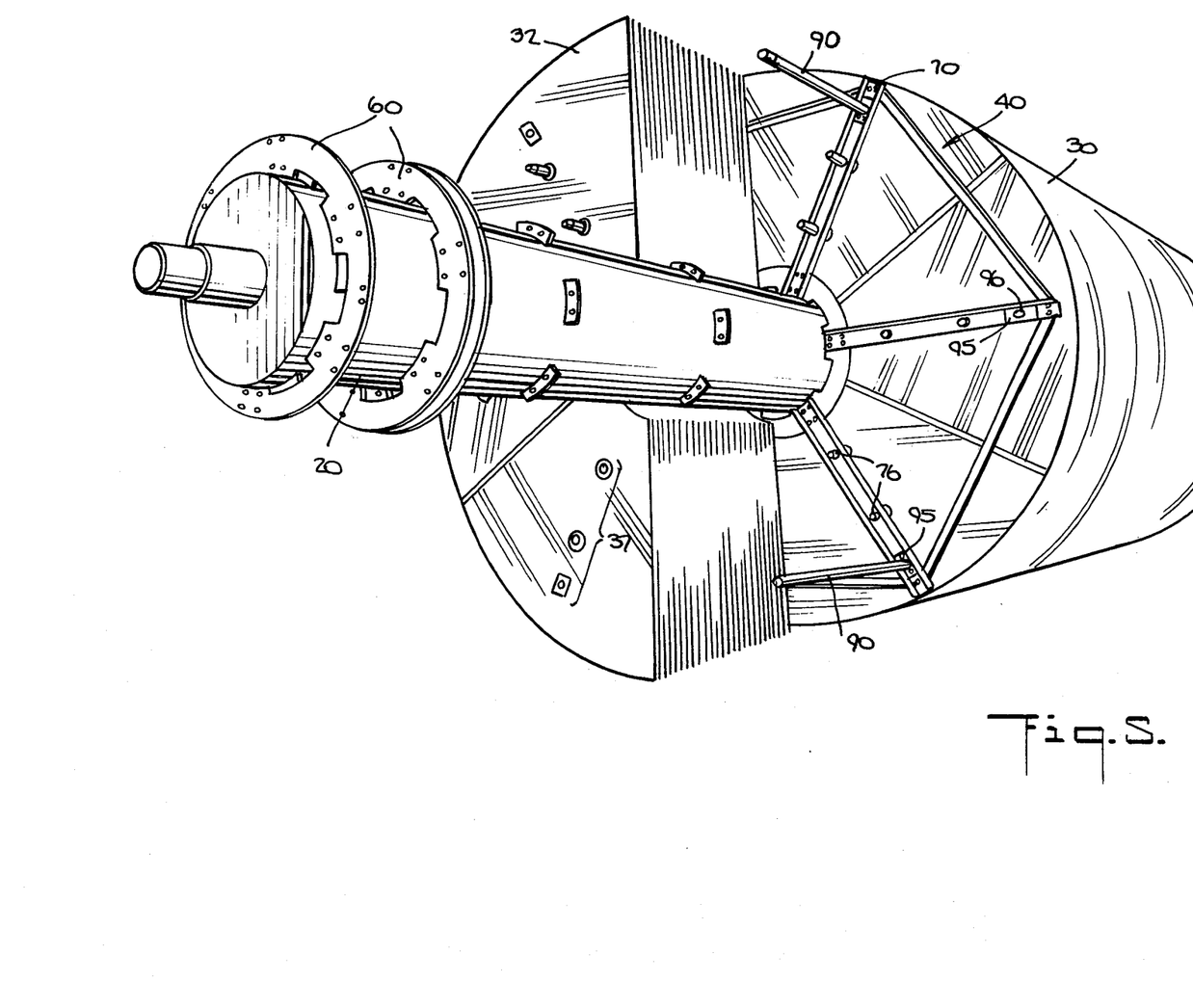
FIG. 5 is a perspective view of the apparatus of FIG. 1 with a portion of the media, an end frame and several of the inner frames removed.

Referring to FIGS. 3 and 5, each circular tube 90, which is adapted to support one media pack 30, is connected to one end of a spoke 70 and is axially disposed therefrom. Tube 90 is, preferably, threadedly engaged to hole 96 of block 95, which block is affixed to spoke 70. This preferred connection provides easy disassembly of the tube from the spoke and, more importantly, enhances strength at the connection of the tube to the spoke.

Clearly, inner frame 40 will disassemble and collar 60 will be released from lugs 24 via removing the first and second means.

Figure 6:
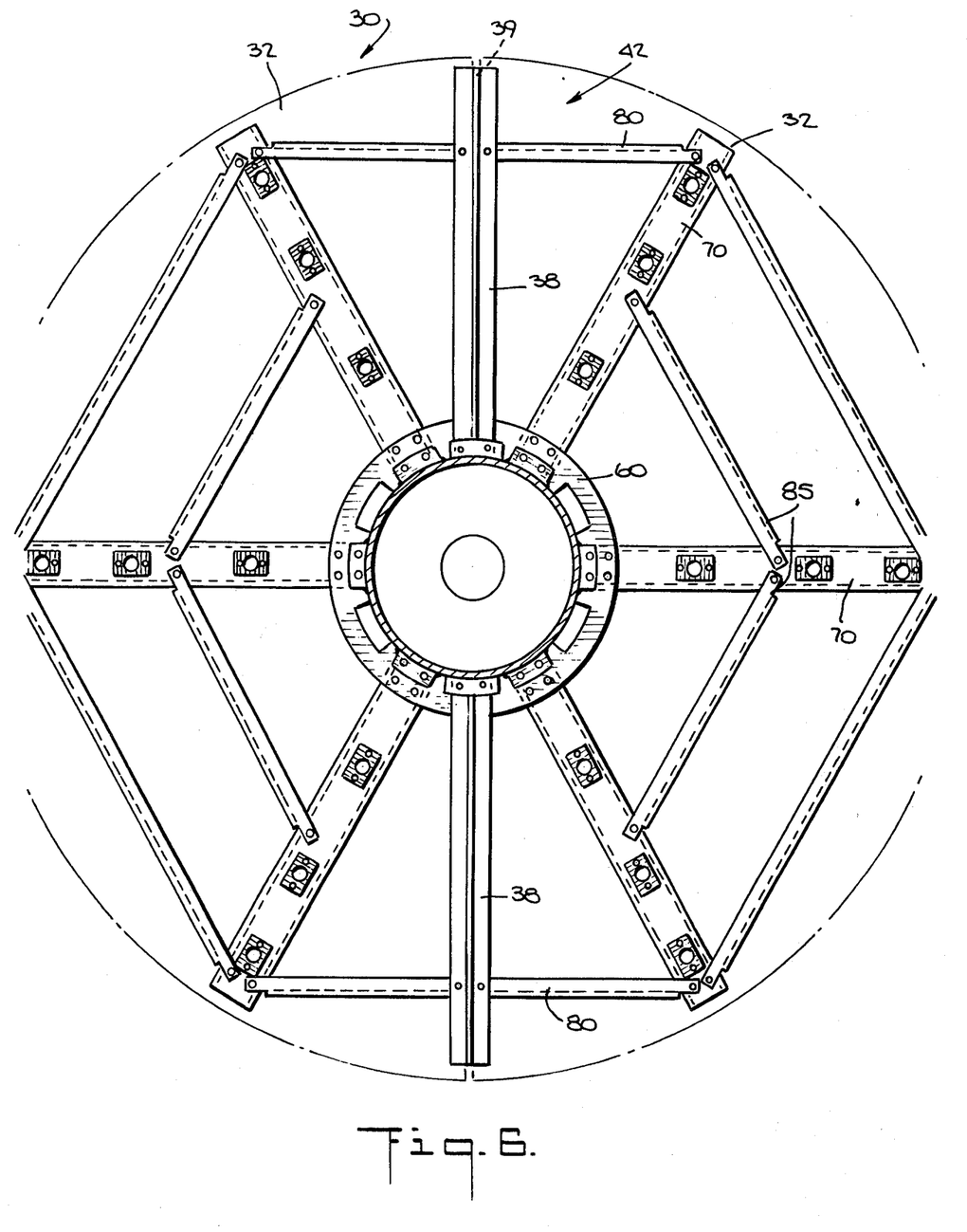
FIG. 6 is a plan view of an end frame of the apparatus of FIG. 1.

Referring to FIG. 6, each end frame 42 is, basically, an inner frame having a number of inner supports 85 and a pair of tee supports 38. Each tee supports 38 is a relatively long, flat member having on one surface a lengthwise radial projection 39 which is adapted to be positioned between the two semi-circular or 180° segments 32 of a media pack 30 located adjacent the end frame. Projection 39 supports the pack by preventing the curling of the edges of the mated discs which comprise the media pack. Each tee support 38 is connected to and radially disposed from collar 60, and is also connected to a separate outer support 80. The connections are effected by the tee support and collar, and the tee support and outer support having aligned holes which receive threadably engageable nut and bolt combinations.

Inner support 85 is, basically, a shorter outer support 80. Each inner support 85 removably connects a different pair of adjacent spokes 70, except the pairs of adjacent spokes which straddle the tee supports 38, at their centermost portion thereby reinforcing end frame 42.

Details of the mated discs, which comprise media packs 30, are disclosed in co-pending Patent Application Ser. No. 241,794, filed Mar. 9, 1981, now U.S. Pat. No. 4,345,997 issued Aug. 24, 1982. for MEDIA by William K. McConnell, Jr. and Charles M. Campbell.

Figure 7:
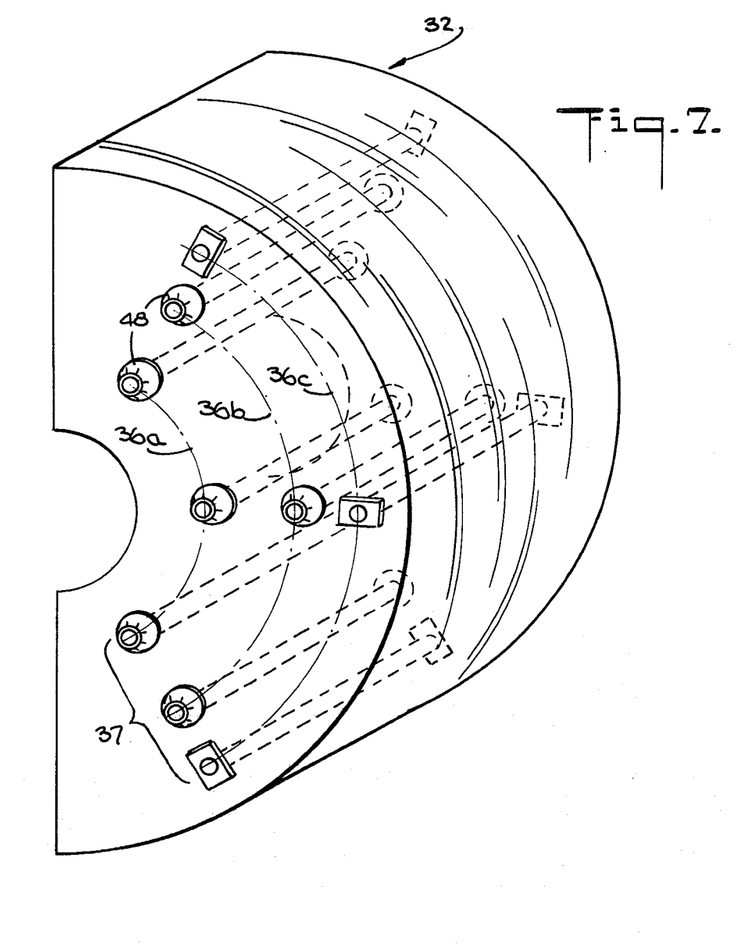
FIG. 7 is a perspective view of the semi-circular segment of media of FIG. 5.

Referring to FIGS. 6 and 7, each pack 30 consists of two semi-circular segments 32, with each segment having three radially disposed rows 36a, 36b, 36c of axial holes therethrough. The corresponding holes in each row form set 37, with the holes of a set 37 disposed in alignment with holes 76 and block 95 of a spoke 70, as shown in FIGS. 5 and 9.

Figure 8:
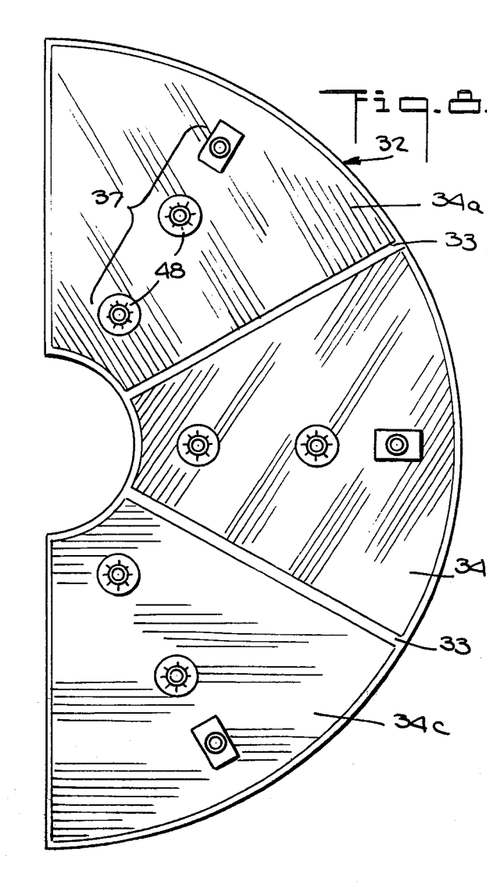
FIG. 8 is a plan view of a preferred embodiment of the semi-circular segment of media of FIG. 5.

Referring to FIG. 8, each segment 32 is, preferably, apportioned via webs 33 into three integral 60° or pie segments 34a, 34b, 34c, with a set 37 located in each pie segment.

Figure 9:
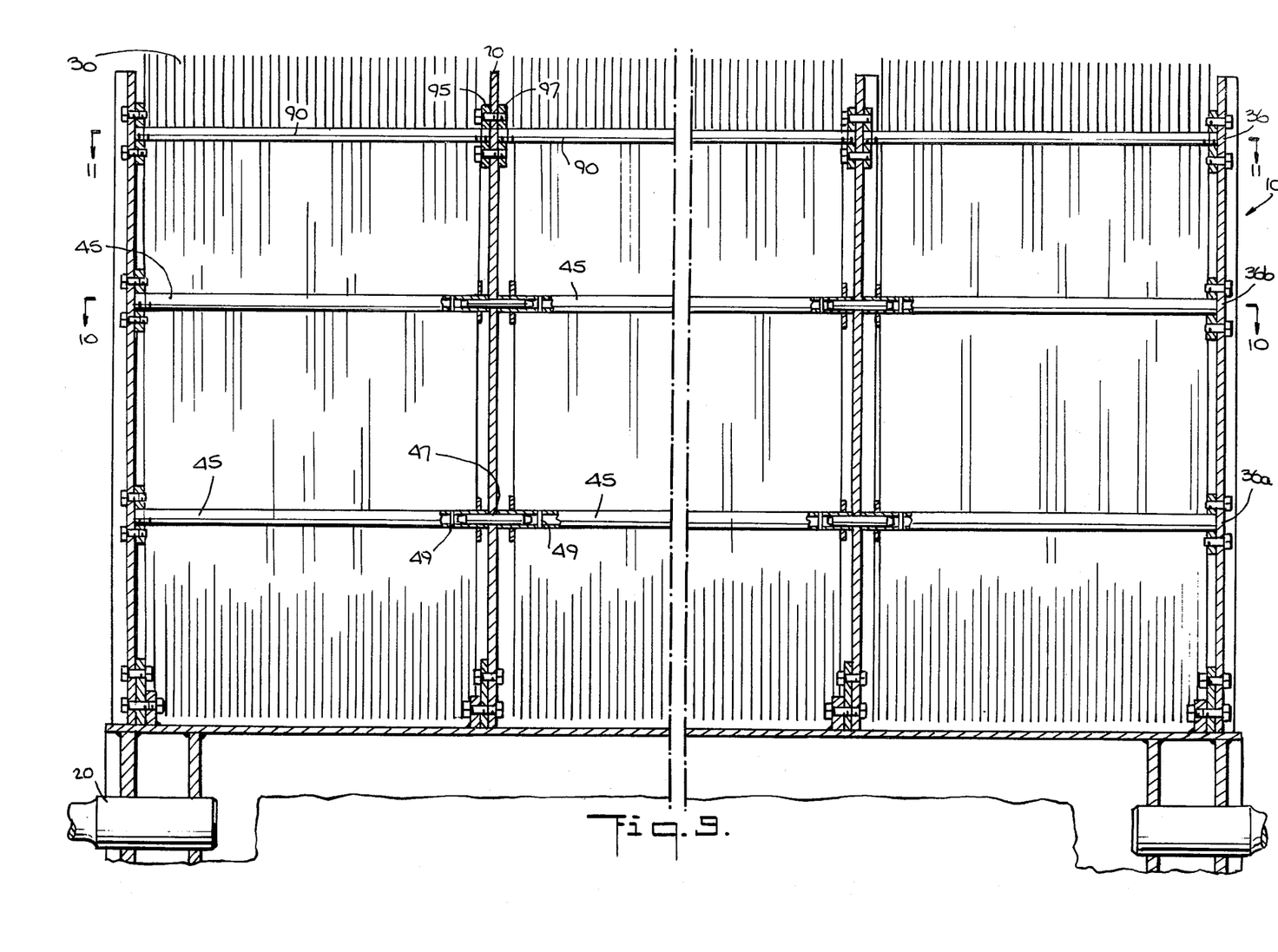
FIG. 9 is a partial cross-sectional view taken along 9—9 of FIG. 1.
Figure 10:
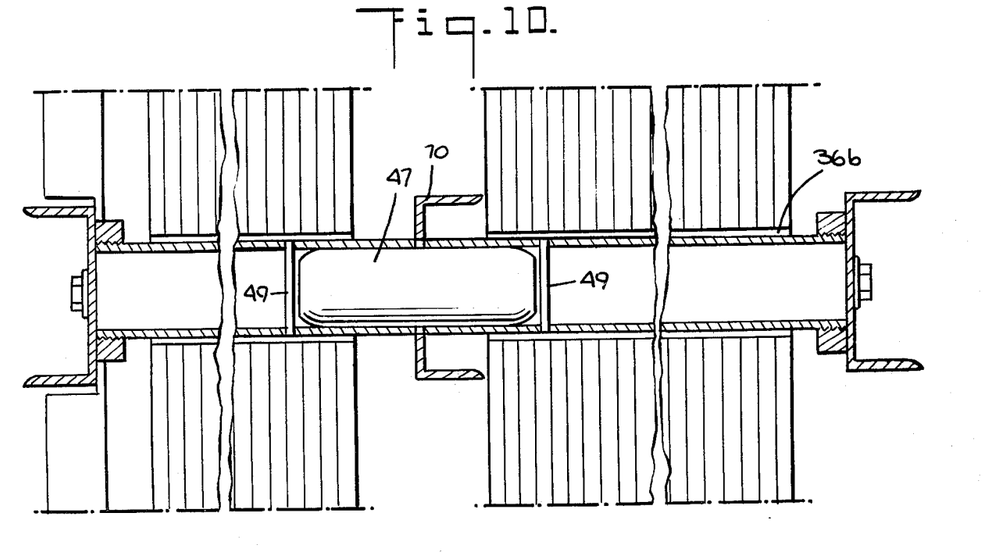
FIG. 10 is a sectional view taken along line 10—10 of FIG. 9.

Referring to FIGS. 9 and 10, a plurality of hollow tie rods or pipes 45 serve to join the discs of a media pack 30 by disposing one pipe in each axial hole in rows 36a and 36b of each media pack. In unassembled condition, as shown in FIGS. 7 and 8, the discs of a media pack 30 are prevented from sliding off pipe 45 via a lock washer or retainer 48 secured about the pipe.

For enhanced structural rigidity, pin 47, which is disposed through a hole 76 of spoke 70, connects corresponding pipes 45 of adjacent media packs. Pin 47 is held in position via rivets 49 which pass radially through each pipe 45 preventing pin 47 from axially shifting.

Figure 11:
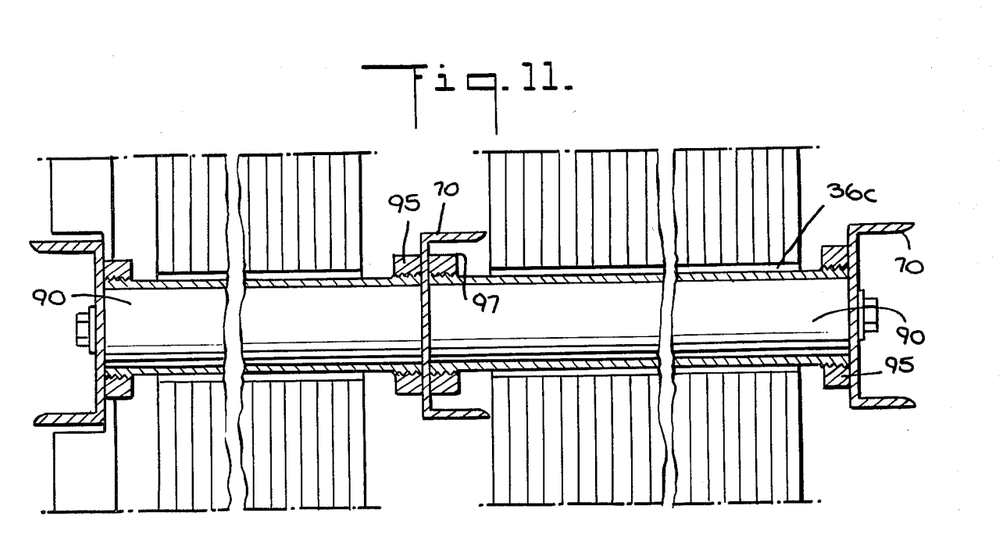
FIG. 11 is a sectional view taken along line 11—11 of FIG. 9.

Referring to FIGS. 9 and 11, every axial hole of row 36c is adapted to receive therein one tube 90. Tube 90 is substantially the same length as pipe 45. Tube 90, which is threadably secured in block 95 of one spoke 70, is also threadably secured in the hole in block 97 which is secured to an adjacent spoke 70.

Referring to FIGS. 3 and 5, to remove from the apparatus, the media pack 30 adjacent an end frame 42, the first and second means of the end frame are removed thereby permitting spokes 70, outer supports 80 and tee supports 38 to be disassembled and removed and collar 60 to slide freely on shaft 20. The two semi-circular sections 32 of media pack 30 are then permitted to move axially off tube 90 of adjacent inner frame 40.

If the media pack 30 to be removed is positioned between any two inner frames 40, the above method of disassembly is repeated for the end frame and any inner frame until the media pack to be removed is reached.

Although certain embodiments have been described and illustrated, modification may be made herein, as by adding, combining or subdividing parts or by substituting equivalents while retaining advantages and benefits of the invention, which itself is defined in the following claims.

We claim:

1. A biological water treatment apparatus, comprising:
   a tank;
   a shaft being mounted for rotation in said tank, said shaft having a plurality of circumferential rows of bayonette lugs;
   a plurality of contactor media packs;
   a plurality of frames each supporting a separate one of said plurality of contactor media packs thereon, each frame including:
   (1) a collar adapted to fit about and be removably secured to one of said plurality of rows of bayonette lugs, each collar having an inner surface with a plurality of recesses, wherein when a collar is secured to said shaft the recesses of said collar and said shaft define flow passages along said shaft;
   (2) a plurality of spokes each having one end removably secured to said collar; and
   (3) a plurality of axially disposed tubes each removably secured to the other end of a separate one of said plurality of spokes, for supporting a contactor media pack thereon; and
   first means for securing each collar to the respective one row of bayonette lugs and spokes.

2. The apparatus of claim 1, wherein each contactor media pack includes two semi-circular sections.

3. The apparatus of claim 1, wherein each frame further includes:
   a plurality of outer supports each being connected to a different adjacent pair of spokes at the other end of the spokes; and
   second means for securing said outer supports to said spokes.

4. The apparatus of claim 1, wherein each frame further includes a plurality of inner supports each being connected a different adjacent pair of spokes approximately at the midpoint of the length of the pair of spokes.

5. A biological water treatment apparatus, comprising:
   a treatment tank;
   an axial shaft mounted for rotation in said tank, said shaft having a plurality of circumferential rows of radially projecting lugs with the lugs in each row being spaced apart from each other;
   a plurality of contactor media packs; and
   a plurality of spider-like frames, each frame including:
   (1) a collar adapted to fit about said shaft and removably secured to one of said plurality of circumferential rows of radially projection lugs, said collar having an inner circumferential surface with a plurality of spaced apart recesses therein, wherein when said collar is fitted about said shaft the recesses of said collar and the spacing between the lugs align to form axial flow passages along the shaft;

(2) a plurality of spokes removably secured at one end to said collar;

(3) a plurality of axially disposed tubes each secured to the other end of a separate one of said plurality of spokes for supporting one of said plurality of contactor media packs thereon;

(4) a plurality of outer supports each being connected at the other end of the spokes to a different adjacent pair of spokes;

(5) first means for securing said plurality of spokes and said collar to one of the circumferential rows of radially projecting lugs; and (6) second means for securing said outer supports to said spokes.

6. The apparatus of claim 5, wherein each frame further includes a plurality of inner supports each being connected to the different adjacent pair of spokes approximately at the midpoint of the length of the pair of spokes.

7. A biological water treatment apparatus, comprising:

a treatment tank;

a axial shaft mounted for rotation in said tank, said shaft having a plurality of circumferential rows of radially projecting lugs;

a plurality of contactor media packs, each contactor media pack including two semi-circular sections; and a plurality of spider-like frames, each fame including:

(1) a collar adapted to fit about said shaft and removably secured to one of the circumferential rows of radially projecting lugs;

(2) a plurality of spokes each removably secured at one end to said collar;

(3) a plurality of axially disposed tubes each secured to a separate spoke at its outer end for supporting one of said plurality of contactor media packs thereon;

(4) a plurality of outer supports each connecting a different adjacent pair of said plurality of spokes;

(5) first means for securing said plurality of spokes and said collar to one of the circumferential rows of raidally projecting lugs; and (6) second means for securing said outer supports to said plurality of spokes, wherein each frame at the distal ends of said shaft includes:

a plurality of inner supports each connecting the different adjacent pair of spokes; and a pair of tee supports each being connected to a separate one of said plurality of outer supports to support the two semi-circular sections of the media pack adjacent said frame.

8. A process for removing from a shaft of a water treatment apparatus a contactor media pack disposed about said shaft between a removable end frame and adjacent inner frame, the contactor media pack having two semi-circular sections with each section having a row of axial holes therethrough and with each hole adapted to receive a tube, said water treatment apparatus, comprising:

a tank;

a shaft being mounted for rotation in said tank, said shaft having a plurality of circumferential rows of bayonette lugs;

a plurality of contactor media packs;

a plurality of frames each supporting a separate one of said plurality of contactor media packs thereon, each frame including:

(1) a collar adapted to fit about and be removably secured to one of said plurality of rows of bayonette lugs, each collar having an inner surface with a plurality of recesses, wherein when a collar is secured to said shaft the recesses of said collar and said shaft define flow passages along said shaft;

(2) a plurality of spokes each having one end removably secured to said collar; and (3) a plurality of axially disposed tubes each removably secured to the other end of a separate one of said plurality of spokes, for supporting a contactor media pack thereon; and first means for securing each collar to the respective one row of bayonette lugs and spokes, said process including the steps of:

axially sliding the end frame along said shaft away from the contactor media pack; and axially sliding one semi-circular section of the contactor media pack off the axially disposed tubes of the inner frame.

* * * * *

UNITED STATES PATENT AND TRADEMARK OFFICE
CERTIFICATE OF CORRECTION

PATENT NO. : 4,444,658

DATED : April 24, 1984

INVENTOR(S) : ROBERT W. HANKES, ET AL.

It is certified that error appears in the above-identified patent and that said Letters Patent is hereby corrected as shown below:

Column 4, line 48, Claim 4, after "connected" insert --to--.

Column 5, line 25, Claim 7, "a" should read --an--;

line 39, Claim 7, "outer" should read --other--.

Signed and Sealed this

Sixth Day of November 1984

[SEAL]

Attest:

GERALD J. MOSSINGHOFF

Attesting Officer

Commissioner of Patents and Trademarks